Oct. 8, 1963  R. A. CONRAD  3,106,234
EGG EVACUATING MEANS
Filed Nov. 28, 1960  2 Sheets-Sheet 1

INVENTOR.
RENÉ ARTHUR CONRAD
BY Alexander Riaboff
ATTORNEY

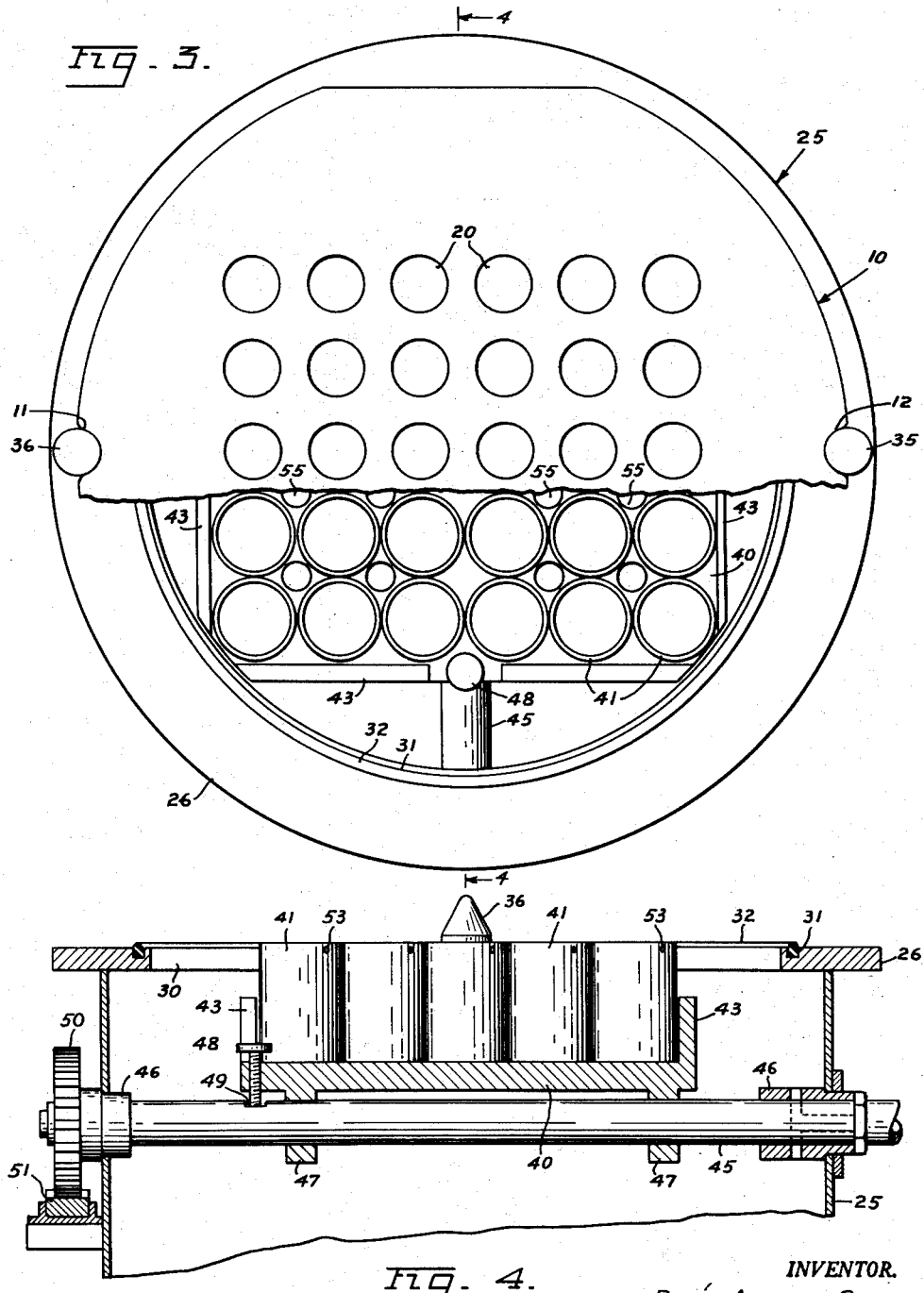

United States Patent Office 3,106,234
Patented Oct. 8, 1963

3,106,234
EGG EVACUATING MEANS
René Arthur Conrad, Richmond, Calif.
(50 Laurel Hill Court, San Mateo, Calif.)
Filed Nov. 28, 1960, Ser. No. 71,950
6 Claims. (Cl. 146—2)

This application is a continuation in part of my copending patent application, Serial No. 2,696, filed on January 15, 1960, now Patent No. 3,055,407, dated September 25, 1962, for Egg Evacuating Process and Means Therefor.

The above patent application describes a machine for evacuating by vacuum the contents of a plurality of eggs perforated on both ends. The machine includes a vacuum chamber open on the top. A tray with plurality of openings therein, each closed by an egg, is placed over said chamber, thereby closing the opening. A plurality of individual cups is arranged in the chamber, each cup being under a respective egg. When the vacuum is introduced in said chamber, the contents of each egg is withdrawn from said eggs into the respective cup under said eggs. Thereupon, the cups are inspected and those with bad eggs are removed. The rest are emptied in a common container. However, when the tray contains a cracked egg among good eggs, the cracked egg immediately collapses and explodes upon the application of vacuum, and is spattered over the chamber and the cups. The opening in which it rested becomes wide open and lets air freely into the chamber to fill the same, thus stopping evacuation of the rest of the eggs on the tray.

It requires considerable time and effort to clean the vacuum chamber and the cups from the spatters of the cracked egg. In spite of careful inspection of eggs, the number of cracked eggs which avoid detection is large, and hence the time consumed by cleaning the machine is very considerable.

The object of this invention is to prevent the spattering of a collapsed egg over the vacuum chamber and the cups therein.

Another object of this invention is to introduce metered vacuum into each individual cup so that the collapse of one or more eggs on the tray does not affect the evacuation of the rest of the eggs.

Another object of this invention is to improve said egg evacuating machine by providing a new egg tray which, in combination with a new cup, isolates each egg from the vacuum chamber and the other cups, so that when an egg collapses under vacuum action, it falls into its cup located under the egg.

Another object of this invention is to provide a machine of the type described having a plurality of individual cups for receiving the contents of eggs placed above said cups, the latter being located in a vacuum chamber, each cup being provided with metered vacuum for drawing the contents of the egg located above the same, which vacuum is not affected in appreciable degree by the collapse of one or more eggs in other cups.

Other objects and advantages will appear as the specification proceeds and the novel features of the device will be particularly pointed out in the claims hereto annexed.

In this specification and the annexed drawing, the invention is illustrated in the form considered to be the best but it is understood, that the invention is not limited to such form; and it is also to be understood that in and by the claims following the description, it is desired to cover the invention in whatsoever form it may be embodied.

My invention is illustrated in the drawings, forming a part of this specification, in which:

FIG. 3 is a plan view of the device, some parts being broken away to show the inner mechanism of the device; and FIG. 4 is a partial cross-sectional view of FIG. 3 taken along the line 4—4 thereof.

Figure 1:
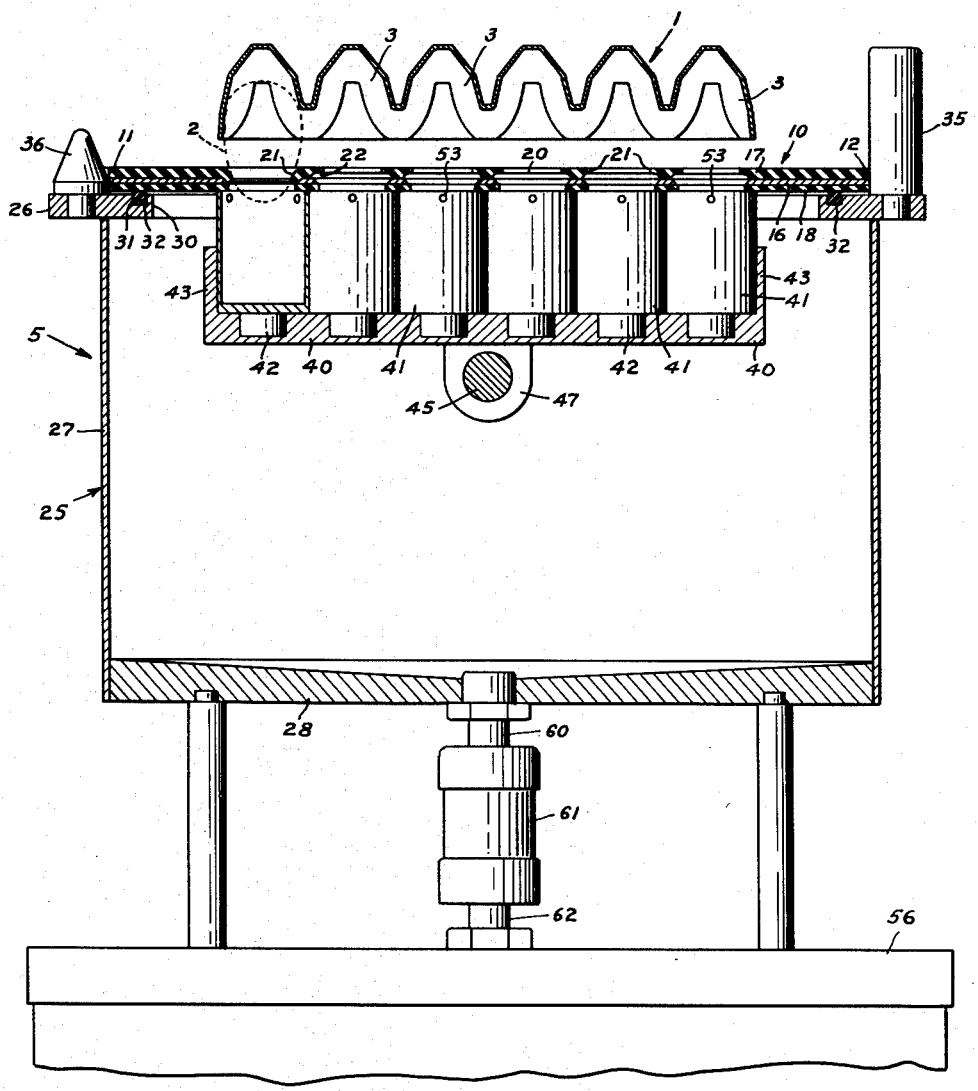
FIG. 1 is a vertical cross-sectional view of the device, some parts being shown in elevation.
Figure 2:
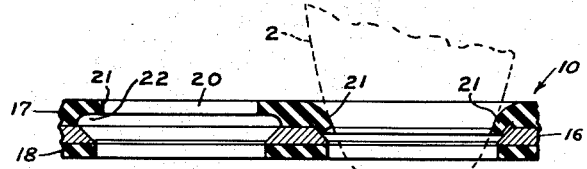
FIG. 2 is a partial enlarged sectional view of the tray showing an egg in an opening in said tray.

In detail, a standard egg carton 1, contains thirty eggs 2, which were previously perforated on both ends. The egg drilling machine, which is particularly described in my copending patent application, Serial Number 855,215 filed on November 24, 1959, wherein the eggs are drilled simultaneously on both ends, may be used for this purpose.

The carton 1 consists of thirty cells 3, arranged in six parallel rows, each containing five cells. It is covered with a tray 10, and both, the carton and the tray, are turned up side down and placed on the top of the machine, after the carton 1 with perforated eggs 2 is delivered to the egg evacuating machine 5.

The tray 10 is generally circular in shape and is formed with two diametrically opposite peripheral indents 11 and 12 by means of which the tray is centered on said machine. The tray 10 consists of a central metal plate 16, preferably made of light metal such as aluminum or its alloys, which plate is covered by a top layer 17 and a bottom layer 18 of soft rubber. The tray is formed with thirty holes 20, which are arranged in six rows each having five holes, each being exactly opposite a respective egg in the egg carton 1.

The top layer 17 forms an inwardly directed flange 21 on the upper edge of the hole, and a rounded groove 22 is provided under said flange so as to permit this flange to bend downwardly and to expand slightly to accommodate an egg in said hole, and thus completely seal the same therein.

The egg evacuating machine 5 comprises a cylindrical vacuum chamber 25 having a ring shaped top 26, a cylindrical wall 27 and a concave bottom 28. The top 26 has a central opening 30, around which is provided a groove 31 containing a sealing O-ring 32, the upper edge of which protrudes above said top.

The top 26 carries a centering pin 35, secured thereto near the periphery thereof at a right angle to the surface and a centering cone 36 secured to said top diametrically opposite to said pin 35. The tray 10 is placed on said top 26 so that the pin 35 fits into the indent 12 and the cone 36 into the indent 11, thus exactly fixing the position of the tray 10 in relation to said chamber.

The chamber 25 contains a rotatable platform 40 arranged inside thereof. The platform is rectangular in plan view with rounded corners and is of slightly smaller dimensions than the opening 30. The platform normally occupies a horizontal position under said opening and carries thirty cups 41 thereon, which are preferably made of stainless steel, or may be made of some light metal, or plastic, with a steel insert in the bottom thereof.

A magnet 42, in form of a short cylinder, is imbedded in the platform under each cup 41 to hold securely the cups on the surface by magnetic force, but the cups may be removed manually from said platform. The cups are preferably of such size as abut each other. Guards 43 in form of vertical ridges are provided at the edges of said platform to prevent an accidental displacement of said cups.

The platform 40 is supported by a shaft 45, extending thereunder diametrically through said chamber and journalled in bearings 46 secured to the sidewall 27. The shaft 45 passes through a pair of lugs 47 extending downwardly from the lower side of said platform and is releasably connected thereto by a thumb screw 48 passing through said platform near the front edge thereof and abutting a flat dent 49 in said shaft.

The shaft 45 extends beyond one of the bearings 46 and carries on its end a spur gear 50 which meshes with, and is operable by a rack 51. The latter moves forth and back and rotates the gear 50, the shaft 45 and the platform 40 with the cups 41 through an arc of about 135 degrees, thus emptying the contents of the cups into the chamber 25 and returning the platform to its normal horizontal position. The rack may be operated by various mechanisms.

The cups 41 are located under the respective holes 20 in the tray 10 and are of such length that they extend from the platform to the tray 10 and firmly abut the bottom rubber layer 18 thereof, thus completely sealing said cups.

In order to introduce vacuum in said cups 41, each of them is provided with three small holes 53, about 5/64" in diameter, equidistantly spaced near the top. The holes 53 are large enough to create vacuum in said cups, when vacuum is introduced into the chamber 25. The vacuum in each cup draws the contents of the egg into the cup through the hole in the lower end of said egg, while air enters into the egg shell through the upper hole. If, however, the egg collapses for any reason, it falls into the cup without spreading into the chamber 25 or in the other cups. Thereupon air enters such cup through the hole 20 in the tray 10, but the holes 53 are of such size that insufficient amount of air passes through said holes from said cup into the chamber 25 to affect the vacuum therein appreciably, and to affect the evacuation of the rest of the eggs.

When the evacuation is completed, the inspector removes the tray 10, inspects the cups and removes those with collapsed or unsatisfactory eggs. The other cups are emptied into the chamber 25. Thereafter the platform is brought to its normal horizontal position, new cups are placed instead of the removed ones and the machine is ready for another cycle of operation.

The platform 40 is provided with a plurality of holes 55 located between diametrically adjoining cups 41 for the purpose of disposing of the egg contents which are spilled on the platform during the emptying of the cups.

It takes four seconds to complete the cycle of evacuation of thirty eggs. The machine requires vacuum from 28" to 22" mercury for its operation.

When the vacuum chamber becomes sufficiently filled up, the contents are emptied into a collector reservoir 56 through a pipe 60, a check valve 61, and a pipe 62 connecting the bottom of the chamber with the top of said reservoir.

I claim:

1. A machine for evacuating a plurality of eggs drilled on both ends comprising a vacuum chamber having an opening in the top thereof, a removable tray, having a plurality of openings thereon for holding eggs, means on the upper edge of each opening for hermetically closing the space between said tray and the egg therein, said tray being adapted to close the opening in the top of said chamber; a platform arranged in said vacuum chamber under said opening; a plurality of cups removably carried by said platform, each cup being located under a respective egg in said tray, means for hermetically sealing the top of each cup to the tray, means for creating metered vacuum in each cup when vacuum is introduced in the chamber for evacuation of eggs, and means for emptying said cups.

2. A device as described in claim 1, in which the means for hermetically sealing the top of each cup to the tray is carried by the tray.

3. A device as described in claim 1, in which the means for hermetically sealing the top of each cup to the tray consists of a layer of resilient material carried by the bottom of said tray.

4. A device as described in claim 1, in which the means for hermetically sealing the top of each cup to the tray consists of a layer of soft rubber secured to the bottom of said tray.

5. A machine for evacuating a plurality of eggs drilled on both ends, comprising a vacuum chamber having an opening in the top thereof, a removable tray having a plurality of openings therein for holding eggs, means on the upper edge of each opening for hermetically closing the space between said tray and the egg therein, said tray being adapted to close the opening in the top of said chamber; a rotatable platform arranged in said vacuum chamber under said opening; a plurality of cups removably carried by said platform, each cup being located under a respective egg in said tray, means for hermetically sealing the top of each cup to the tray, each cup having an opening on the side thereof for creating vacuum in the cup when vacuum is introduced in the chamber for evacuating eggs, and means for emptying said cups into the chamber after said tray has been removed, the contents of the cups inspected and the cups with bad eggs removed.

6. A machine for evacuating a plurality of eggs perforated on both ends;
   comprising a vacuum chamber having a top with an opening therein;
   a removable tray for closing the above mentioned opening and having a plurality of egg openings therein for holding eggs;
   means on the upper edge of each last mentioned opening for hermetically closing the space between the tray and the egg therein;
   a platform arranged in said vacuum chamber under the first mentioned opening;
   a plurality of cups removably carried by said platform, each cup being located under a respective egg in said tray, said tray sealing each cup;
   each cup having an opening near the top thereof for introducing vacuum in the cup when vacuum is created in the chamber for evacuating eggs;
   means for rotating said platform for emptying the contents of the cups into the chamber after the tray has been removed, the contents of each cup have been inspected, and cups with bad eggs have been removed.

References Cited in the file of this patent
UNITED STATES PATENTS

| | | |
|---|---|---|
| 498,488 | Power | May 30, 1893 |
| 1,496,312 | Harkin | June 3, 1924 |
| 2,445,490 | Meade | July 20, 1948 |
| 2,581,054 | Vansant | Jan. 1, 1952 |
| 2,735,464 | Kerven | Feb. 21, 1956 |